US009462301B2

(12) United States Patent
Paśko

(10) Patent No.: US 9,462,301 B2
(45) Date of Patent: Oct. 4, 2016

(54) GENERATING VIDEOS WITH MULTIPLE VIEWPOINTS

(71) Applicant: Google Inc., Mountain View, CA (US)

(72) Inventor: Stanislaw Paśko, Lubon (PL)

(73) Assignee: GOOGLE INC., Mountain View, CA (US)

(*) Notice: Subject to any disclaimer, the term of this patent is extended or adjusted under 35 U.S.C. 154(b) by 182 days.

(21) Appl. No.: 13/839,617

(22) Filed: Mar. 15, 2013

(65) Prior Publication Data

US 2014/0270706 A1  Sep. 18, 2014

(51) Int. Cl.
| | | |
|---|---|---|
| H04N 9/87 | (2006.01) | |
| H04N 21/218 | (2011.01) | |
| H04N 21/239 | (2011.01) | |
| H04N 21/414 | (2011.01) | |
| H04N 21/6587 | (2011.01) | |
| H04N 21/854 | (2011.01) | |
| G11B 27/034 | (2006.01) | |
| G11B 27/28 | (2006.01) | |
| G11B 27/34 | (2006.01) | |

(52) U.S. Cl.
CPC ....... *H04N 21/21805* (2013.01); *G11B 27/034* (2013.01); *G11B 27/28* (2013.01); *G11B 27/34* (2013.01); *H04N 21/2393* (2013.01); *H04N 21/41407* (2013.01); *H04N 21/6587* (2013.01); *H04N 21/854* (2013.01)

(58) Field of Classification Search
CPC .............. H04N 21/21805; H04N 21/8126; H04N 21/2187; H04N 21/4223; H04N 7/181; G06T 2219/028
See application file for complete search history.

(56) References Cited

U.S. PATENT DOCUMENTS

| | | |
|---|---|---|
| 7,999,842 B1 | 8/2011 | Barrus et al. |
| 8,363,109 B2 | 1/2013 | Dunkel et al. |
| 2002/0118969 A1* | 8/2002 | Kanade et al. ............... 396/322 |
| 2003/0210329 A1* | 11/2003 | Aagaard et al. .............. 348/159 |
| 2004/0085335 A1* | 5/2004 | Burlnyk .............. G06F 3/04815 715/716 |
| 2009/0028462 A1* | 1/2009 | Habuka et al. ............... 382/284 |
| 2012/0057852 A1* | 3/2012 | Devleeschouwer et al. . 386/278 |
| 2012/0098925 A1 | 4/2012 | Dasher et al. |
| 2014/0003799 A1* | 1/2014 | Soroushian et al. .......... 386/353 |

OTHER PUBLICATIONS

PCT Application No. PCT/US2014/026821, International Search Report and Written Opinion dated Jul. 28, 2014.

\* cited by examiner

*Primary Examiner* — Hung Dang
*Assistant Examiner* — Sunghyoun Park
(74) *Attorney, Agent, or Firm* — Lowenstein Sandler LLP

(57) ABSTRACT

Videos of an event may be captured by camera (e.g., camera devices). The videos may be processed to generated virtual videos that provide different viewpoints of the event. The videos and virtual videos may be analyzed to identify panning points in the videos. A user may pause the video at the identified panning points and may be allowed to pan around the event and/or event location during the identified panning points in the videos and/or virtual videos. The pan around view may be provided by a pan around video generated based on the videos and/or the virtual videos. A user may resume viewing one of the videos and/or virtual videos after pausing playback of the pan around video. A user may also pan around an event and/or event location while the videos and/or virtual videos are playing during the panning points.

25 Claims, 10 Drawing Sheets

GENERATING VIDEOS WITH MULTIPLE VIEWPOINTS

BACKGROUND

Computing devices such as smart phones, cellular phones, laptop computers, desktop computers, netbooks, tablet computers, etc., are commonly used for a variety of different purposes. Users often use computing devices to use, play, and/or consume digital media items (e.g., view digital images, watch digital video, and/or listen to digital music). Users also use computing devices to view videos of real-time events (e.g., an event that is currently occurring) and/or previous events (e.g., events that previously occurred and were recorded). An event may be any occurrence, a public occasion, a planned occasion, a private occasion, and/or any activity that occurs at a point in time. For example, an event may be a sporting event, such as a basketball game, a football game, etc. In another example, an event may be a press conference or a political speech/debate.

Videos of events are often recorded and the videos are often provided to users so that the users may view these events. The events may be recorded from multiple viewpoints (e.g., a football game may be recorded from the sidelines and from the front end and back end of a field). These multiple videos may be provided to users to allow users to view the event from different viewpoints and angles.

SUMMARY

In one embodiment, a method including receiving a plurality of videos of an event, wherein the plurality of videos are associated with a plurality of viewpoints of the event, receiving one or more virtual videos of the event, wherein the one or more virtual videos are associated with one or more of the plurality of viewpoints of the event, identifying a plurality of panning points, wherein each panning point in the plurality of panning points is associated with one video from the plurality of videos or one virtual video from the one or more virtual videos, and generating one or more pan around videos of the event based on the plurality of panning points is provided.

In one embodiment, means for receiving a plurality of videos of an event, wherein the plurality of videos are associated with a plurality of viewpoints of the event, means for receiving one or more virtual videos of the event, wherein the one or more virtual videos are associated with one or more of the plurality of viewpoints of the event, means for identifying a plurality of panning points, wherein each panning point in the plurality of panning points is associated with one video from the plurality of videos or one virtual video from the one or more virtual videos, and means for generating one or more pan around videos of the event based on the plurality of panning points are provided. In another embodiment, means for providing a first video from the plurality of videos or a first virtual video from the one or more virtual videos to a client device, means for receiving user input indicating a user request to change to a different viewpoint of the event, means for identifying a next video or a next virtual video based on the user input, means for identifying a next panning point in the next video or the next virtual video; and means for providing the next video or the next virtual video to the client device at the next panning point are provided. In a further embodiment, means for generating the one or more virtual videos of the event based on the plurality of videos of the event is provided. In a further embodiment, means for providing a first video from the plurality of videos or a first virtual video from the one or more virtual videos to a client device, means for receiving user input indicating that playback of the first video or the first virtual video should be paused, means for identifying a first panning point from the plurality of panning points, and means for pausing playback of the video at the next panning point. In one embodiment, means for identifying a first pan around video from the one or more pan around videos based on the first panning point and means for providing the first pan around video to the client device are provided.

In one embodiment, means for receiving a second user input indicating that playback of the first pan around video should be paused, means for identifying a second panning point in the pan around video, means for pausing playback of the pan around video at the second panning point, means for receiving a third user input requesting playback of a second video from the plurality of videos or a second virtual video from the one or more virtual videos, means for identifying the second video or the second virtual video based on the second panning point, means for providing the second video or second virtual video to the client device are provided.

In another embodiment, means for generating a first pan around video that provides a view of the event that pans around the event in a clockwise direction and means for generating a second pan around video that provides a view of the event that pans around the event in a counter-clockwise direction are provided.

In additional embodiments, computing devices for performing the operations of the above described embodiments are also implemented. Additionally, in embodiments of the disclosure, a computer readable storage media may store instructions for performing the operations of the embodiments described herein.

The above summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

System and methods for generating and providing videos of an event and/or event location are provided. Videos of an event may be captured by camera (e.g., camera devices). The videos may be processed to generate virtual videos that provide different viewpoints of the event. The videos and virtual videos may be analyzed to identify panning points in the videos. In one embodiment, a user may pause a video and/or a virtual video at the identified panning points and may be allowed to pan around the event and/or event location during the identified panning points in the videos and/or virtual videos. The pan around view may be provided by a pan around video generated based on the videos and/or the virtual videos. A user may resume viewing one of the videos and/or virtual videos after pausing playback of the pan around video. In another embodiment, a user may pan around an event and/or event location while the videos and/or virtual videos are playing during the panning points (e.g., a period of time).

Figure 1:
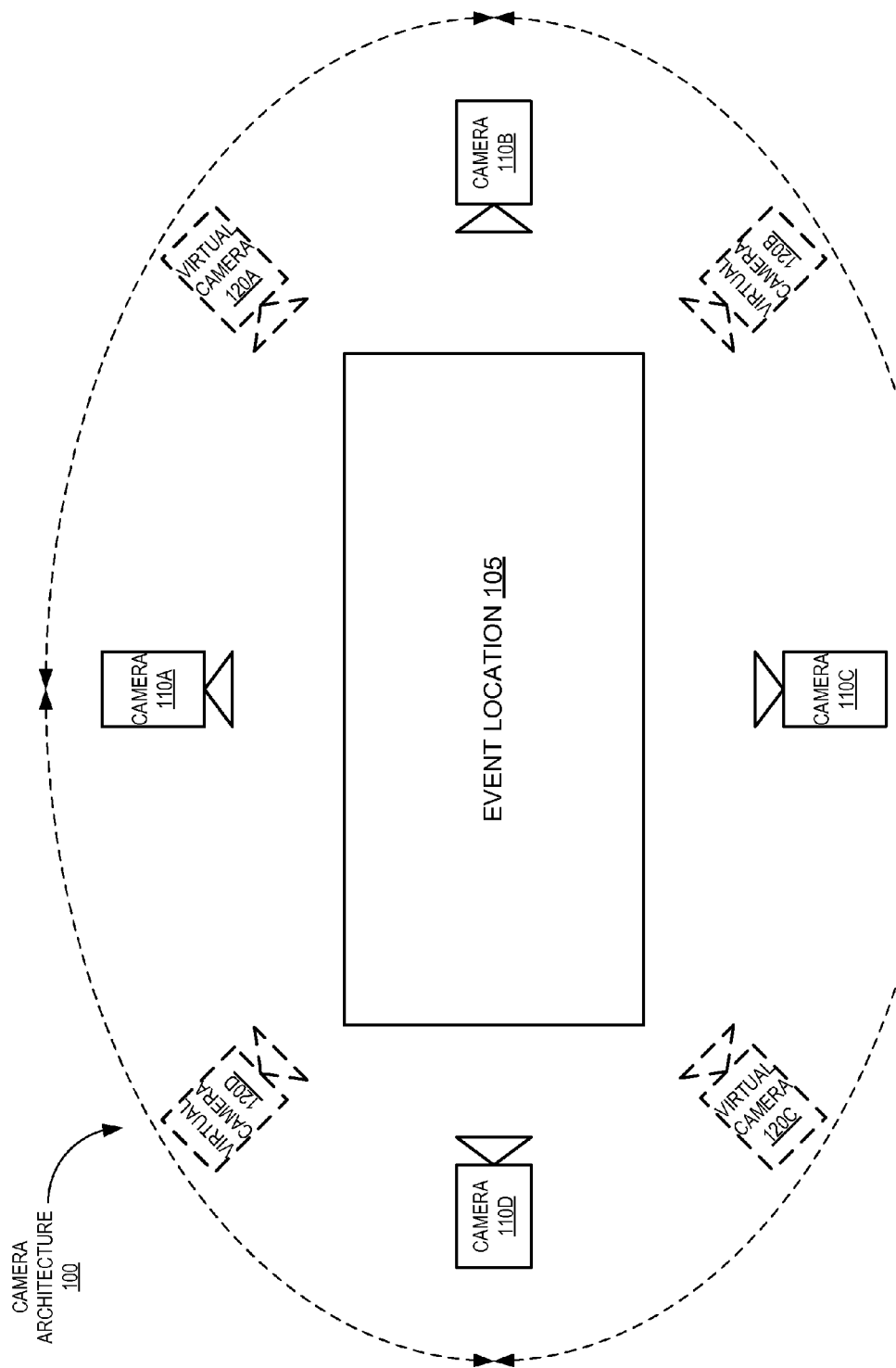
FIG. 1 is a block diagram illustrating an example camera architecture, in accordance with one embodiment of the present disclosure.

FIG. 1 is a block diagram illustrating an example camera architecture 100, in accordance with one embodiment of the present disclosure. In one embodiment, the camera architecture 100 may capture (e.g., take) videos and/or sequences of images of an event that occurs at the event location 105. For example, the camera architecture 100 may capture videos and/or images of a basketball game that occurs at the event location 105. In another example, the camera architecture 100 may captures videos and/or images of a concert that occurs at the event location 105. In a further example, the camera architecture 100 may capture videos and/or images of a conference, debate, a press release and/or a political event that occurs at the event location 105. In other embodiments the event and/or event location 105 may be any shape (e.g., circular, oval, irregular shapes, etc.).

The camera architecture 100 includes cameras 110A through 110D positioned around the event location. The cameras 110A through 110D may be physical and/or real cameras that are capable of capturing and/or generating (e.g., taking) images (e.g., pictures) and/or videos (e.g., a sequence of images) of the object 115. In one embodiment, the cameras 110A through 110D may capture video and/or images of an event location 105 (e.g., of an event at the event location) at a certain speed and/or rate. For example, the cameras 110A through 110D may capture multiple images of the object 115 at a rate of one hundred images or frames per second (FPS) or at 30 FPS. The cameras 110A through 110D may be digital cameras or may be film cameras (e.g., cameras that capture images and/or video on physical film). The images and/or videos captured and/or generated by the cameras 110A through 110D may also be referred to as image arrays or arrays of images. The images and/or videos captured and/or generated by the cameras 110A through 110D may be in a variety of formats including, but not limited to, moving picture experts group format, MPEG-4 (MP4) format, DivX® format, Flash® format, a QuickTime® format, an audio visual interleave (AVI) format, a Windows Media Video (WMV) format, an H.264 (h264, AVC) format, a hypertext markup language-5 (HTML5) video format, a Joint Picture Experts Group (JPEG) format, a bitmap (BMP) format, a graphics interchange format (GIF), a Portable Network Graphics (PNG) format, etc. In one embodiment, the images (e.g., arrays of images or image arrays) and/or videos capture by one or more of the cameras 110A through 110D may be stored in a data store such as memory (e.g., random access memory), a disk drive (e.g., a hard disk drive or a flash disk drive), and/or a database (as discussed below in conjunction with FIGS. 3 and 5).

Camera 110A is positioned at the top edge of event location 105, camera 110B is positioned at the right edge of the event location 105, camera 110C is positioned at the bottom edge of the event location 105, and camera 110D is positioned at the left edge of the event location 105. Each of the cameras 110A through 110D is located at a position which provides each camera 110A through 110D with a particular viewpoint of the event location 105. For example, if a sporting event (e.g., a football game) occurs at the event location 105, camera 110A is located in a position that has a viewpoint of the event location 105 from one of the sidelines. Although four cameras (e.g., cameras 110A through 110D) are illustrated in FIG. 1, it should be understood in other embodiments, any number of cameras may be included in the camera architecture 100. For example, the camera architecture 100 may include twenty cameras or fifty hundred cameras. In other embodiments, the positions of the cameras (and thus the viewpoints of the event location for the cameras) may vary. For example, the cameras 110A through 110D may be arranged around the event location 105 in a variety of different layouts and/or positions (e.g., two cameras along the top edge and two cameras along the bottom edge).

In one embodiment, the operation of the cameras 110A through 110D may be synchronized with each other and the cameras 110A through 110D may capture images and/or videos of the event location 105 in a synchronized or coordinated manner (e.g., the videos captured by the cameras 110A through 110D may be synchronized in time). For example, each of the cameras 110A through 110D may capture images and/or videos at a rate of thirty frames/images per second. Each of the cameras 110A through 110D may capture the images and/or videos of the event location 105 (e.g., of an event at the event location) at the same (or substantially the same) point in time. For example, if the cameras 110A through 110D start capturing images at the same time (e.g., time T or at zero seconds), the cameras 110A through 110D may each capture a first image of the event location 105 at time T+1 (e.g., at ⅓₀ of a second), a second image of the object 115 at time T+2 (e.g., at ⅔₀ of a second), a third image of the event location 105 at time T+3 (e.g., at ³⁄₃₀ of a second), etc.

Figure 3:
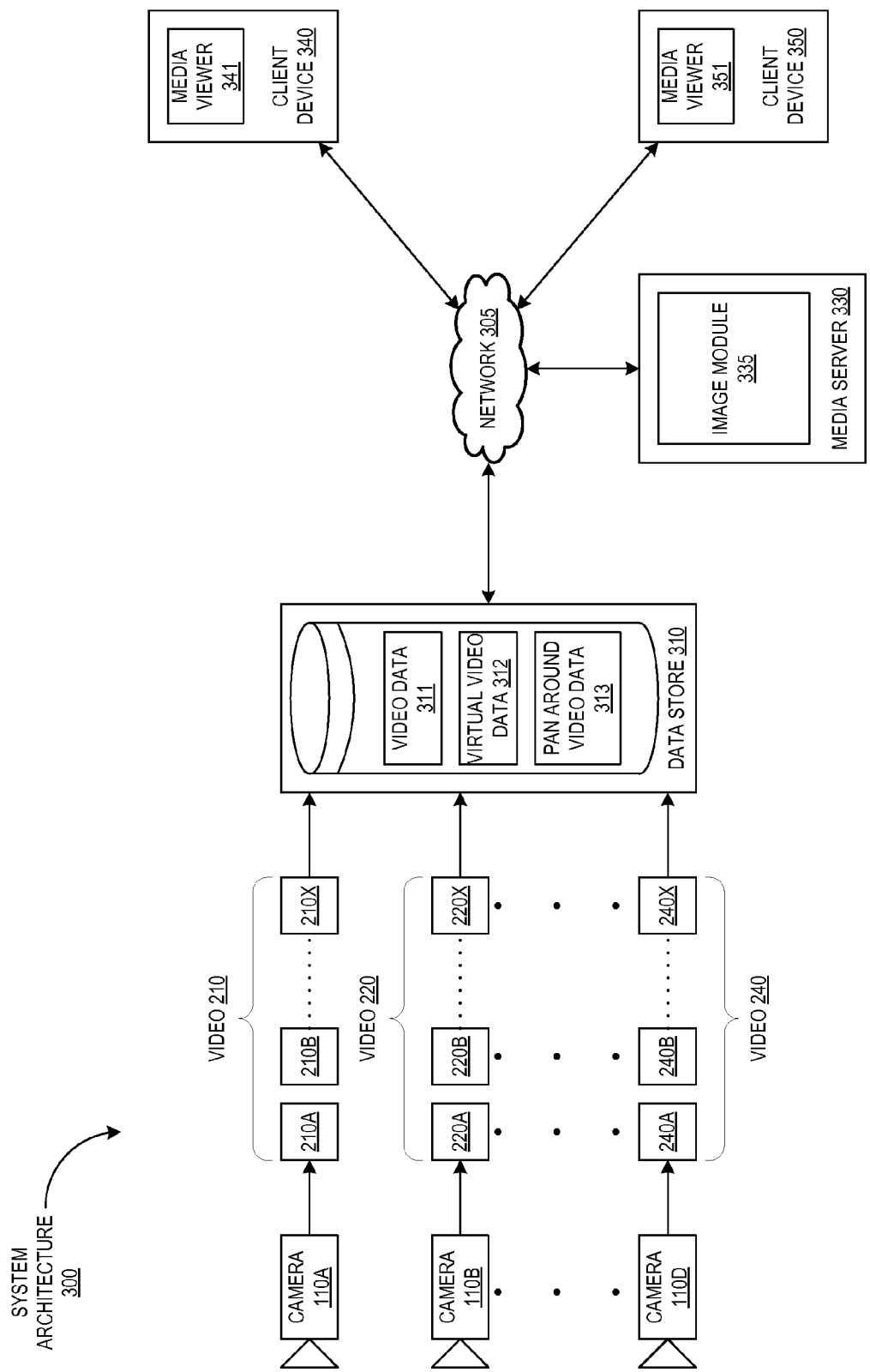
FIG. 3 illustrates an example system architecture, in accordance with one embodiment of the present disclosure.

In another embodiment, the images and/or videos may be processed and/or analyzed by a computing device, such as a media server illustrated in FIG. 3 to generate or obtain one or more virtual videos and/or images of the event location 105. A virtual video may be a video that includes frames and/or images that were not captured and/or generated by a physical (e.g., actual) camera. For example, a virtual video may include frames and/or images that are generated based on frames and/or images that were captured by a physical camera (e.g., an actual camera). In one embodiment, the media server may analyze the frames, images and/or videos to generate a 3-dimensional environment and/or 3-dimensional (3D) models/meshes of the event location 105 (e.g., of the event at the event location 105). A 3D environment and/or a 3D model/mesh may be a collection of vertices, edges and faces (e.g., polygonal shapes or surfaces) that define the shape and/or boundary of an object. The faces may consist of various polygonal shapes such as triangles, quadrilaterals, simple convex polygons, concave polygons, and/or polygons with holes.

The media server may generate a virtual video of the event location 105 based on the 3D model and/or 3D models/meshes of the event location 105 (e.g., of the event at the event location). For example, the cameras 110A through 110D may capture (e.g., generate and/or take) videos and/or images of a basketball game (e.g., an event). The camera 110A may capture a video of a player from a left side viewpoint and the camera 110B may capture a video of the player from a front viewpoint. The media server may analyze the videos to generate a 3D environment and/or 3D models/meshes of the basketball game, including the player. The media serer may generate a new video (e.g., a virtual video) and/or new images (e.g., virtual images) of the player from a front-left viewpoint, based on the videos and/or images form the cameras 110A and 110B. In one embodiment, the media server may generate virtual videos without generating a 3D environment and/or 3D models/meshes. For example, between consecutive pairs of source cameras (e.g., camera 110A and 110B), a stereoscopic disparity may be computed using a disparity-estimating algorithm to generate a disparity map. The disparity map may be considered a depth component and may be merged with the images in the videos to create a red, green, blue, Z-depth (RGBZ) images. The RGBZ images may be used to compute and/or generate intermediary views (e.g., virtual camera 120A) between viewpoints of the two source cameras. In another example, an image may be processed and/or divided into segments, where each segment is an identifiable, separate object. Such segments are then matched against segments from other cameras. When creating virtual images, the whole scene may be rotated, and the segments may be shifted to a different place and scaled appropriately. In a further example, individual segments may be additionally morphed, proportionally to the rotation.

In other embodiments, any algorithm, function, methods, and/or applications/programs may be used to generate the virtual videos and/or virtual images from actual videos and/or images captured by physical cameras (e.g., cameras 110A through 110D). For example, the applications such as Patch-Based Multi-View Stereo Software (PMVS) may be used to generate virtual videos and/or virtual images. In another example, algorithms such as the StereoBM or StereoSGBM algorithms, the Alpha Expansion algorithm, and/or energy-minimization based algorithms using belief propagation and/or graph cuts may be used.

The virtual videos and/or images generated by the media server may provide different viewpoints of the event location 105 than the viewpoints of the physical and/or actual cameras 110A through 110D. In one embodiment, the media server may generate virtual videos and/or virtual images of the event location 105 from the viewpoint of "virtual cameras." A virtual camera may be a viewpoint of the event and/or event location 105 where there is no physical and/or actual camera. Referring back to FIG. 1, the media server may generate four virtual videos based on the actual videos and/or images captured by the cameras 110A through 110D. The first virtual video may be from the viewpoint of virtual camera 120A, the second virtual video may be from the viewpoint of virtual camera 120B, the third virtual video may be from the viewpoint of virtual camera 120C, and the fourth virtual video may be from the viewpoint of virtual camera 120D. In one embodiment, the virtual videos from the viewpoints of virtual cameras 120A through 120D may be computer generated (e.g., virtual) videos of the event location 105, instead of an actual video captured by an actual, physical camera (e.g., cameras 110A through 110D). In one embodiment, the media server may identify a plurality of panning points in the videos and/or virtual videos. A panning point may be a time, a frame, an image, a period of time (e.g., a period of five seconds, sixty seconds, etc.), multiple frames, and/or multiple images in a video and/or virtual video where a user is allowed to pause the video and/or virtual video and/or pan around the event location 105 while viewing the videos and/or virtual videos. As discussed above, the videos and/or virtual videos may be synchronized in time. The panning points for the videos and/or virtual videos may also be synchronized in time. For example, a set of panning points for the videos and/or virtual videos (e.g., one panning point for each video and/or virtual video) may be at the same time within each of the videos and/or virtual videos (e.g., the panning point may be five seconds into each of the videos and/or virtual videos) and/or may be at the same time in the event that is occurring at the event location (e.g., the panning point may be right before a player in a basketball game throws a ball).

In one embodiment, the panning points may be identified based on user input. For example, a user viewing the videos and/or virtual videos of the event location 105 (e.g., of the event) may identify important and/or interesting points in time (e.g., a highlight of a speech, a touchdown in a football game, etc.) within the video and/or virtual videos as panning points. In another embodiment, the panning points may identified by selecting certain frames and/or images within a video and/or virtual video to be panning points. For example, every twenty frames may be a panning point. In another example, every intra-coded frame (I-frame) may be a panning point. In a further example, every third I-frame may be a panning point. In yet another example, every other block of five seconds within the videos and/or virtual videos may be a panning point. In a further embodiment, the panning points may be identified using any algorithm, functions, actions, and/or operation that may process videos and/or virtual videos and one or more panning points based on metrics and/or rules. For example, panning points may be identified by a scene detection algorithm that detects changes in scenes and/or scenery within a video.

Because the panning points are synchronized in time across the videos and/or virtual videos (e.g., at the same times within the videos and/or at the same time in the event), the user may also be allowed to pan around the event location 105 at the panning point (e.g., at that point in time). For example, a user may be watching a video captured by camera 110A. The user may pause the video at a panning point within the video. The user may pan around the event location 105 in a clockwise and/or counter-clockwise direction (following the dashed lines illustrated in FIG. 1) around the event location 105. For example, the user may move between different viewpoints of the event location 105 at the panning point (e.g., at a specific time) in a clockwise direction and/or a counter-clockwise direction following the dashed lines illustrated in FIG. 1. During the pan around, the viewpoint of the user may be pointed towards the event location 105. In another example, a user may be watching a video captured by camera 110B. The user may pan towards the viewpoint of camera 120B while watching the video captured by camera 110B and may switch to viewing the virtual video of the event location 105 from the viewpoint of the camera 120B.

In one embodiment, a user may switch between different videos and/or virtual videos during and/or at a panning point. For example, the may begin watching a virtual video from the viewpoint of virtual camera 120C. The user may indicate (via a button on a user interface) that the user wishes to pan towards the left (e.g., in a clockwise direction along the dotted arrows). The media server may stop providing the virtual video from the viewpoint of the virtual camera 120C and may begin providing the video captured by the camera 110D starting from the point in time in which the user indicated that the user wanted to pan to a different point.

In another embodiment, the media server may generate additional videos (e.g., video streams) and/or images of the event location 105, based on the actual videos and/or images of the event and the virtual videos and/or images of the event location 105. As discussed above, the media server may identify panning points in the videos and/or virtual videos of the event location 105. The additional videos may provide the user with the pan around view of the event location 105 at the identified panning point. For example, the additional videos may provide the user with a pan around view of the event location 105 at a specific point in time. In one embodiment, the pan around view may be a view of the event location 105 from an outer edge and/or perimeter of the event location 105. In another embodiment, panning around the event and/or event location 105 along the direction of dotted arrows shown in FIG. 1 may be referred to as rotating around the event and/or event location 105. The additional videos may also be referred to as pan around videos.

The media server may generate a pan around video (e.g., an additional video) that provides the pan around view of the event location 105 during or at the panning point. For example, a panning point may be at five seconds into the videos and/or virtual videos. The media server may analyze and/or process the videos and/or virtual videos to generate the pan around video that provides the pan around view of the event location 105 during and/or at the panning point (e.g., at the five second mark in the videos and/or virtual videos). In one embodiment, the pan around video (that provides the pan around view of the event location 105 at a specific point in time) may allow a user to view certain times in an event from multiple viewpoints and/or angles. For example, in a football game, a panning point may be right before a player is about to score a goal. The media server may generate a pan around video that provides a pan around view of the event location and the player at the point in time where the player is about to score the goal. This may allow the user to see the player from multiple angles and view points (e.g., from a front viewpoint, back viewpoint, right viewpoint, left viewpoint, diagonal viewpoint, etc.) which may provide the user with a more useful, more immersive and/or more interactive experience of the event.

In one embodiment, the media server may generate one pan around video (e.g., a pan around video) for each panning point. For example, each of the videos and/or virtual videos may have twenty panning points and each of the twenty panning points may be synchronized in time. The media server may generate twenty pan around videos, one for each panning point. In another embodiment, the media server may generate two pan around videos for each panning point. The first pan around video may pan around the event location 105 at the panning point in a clockwise direction and the second pan around video may pan around the event location 105 at the panning point in a counter-clockwise direction, or vice versa.

As discussed above, a user may switch between different videos and/or virtual videos at and/or during panning points (e.g., may pan from the viewpoint of a camera towards the viewpoint of another camera or virtual camera). For example, a user may switch between viewing the video generated by the camera 110D to viewing a video from the viewpoint of virtual camera 120D during a panning point. Also as discussed above, a user may pause a video at a panning point and may begin viewing the pan around video (e.g., the additional video) of the event location at the panning point. The user may also pause the pan around video. In one embodiment, when the user pauses the pan around video, the playback of the pan around video may not pause until certain locations around the event location are reached within the pan around video. The certain locations may be locations (e.g., additional panning points) where the cameras (e.g., cameras 110A through 110D) and/or virtual cameras (e.g., virtual cameras 120A through 120D) are located. For example, a user may view a pan around video of the event location 105 starting from the viewpoint of camera 110A. The pan around video may pan around the event location 105 in a clockwise direction along the dotted lines in FIG. 1 towards the viewpoint of the virtual camera 120A. If the user pause the pan around video when the viewpoint is between the camera 110A and the virtual camera 120A, the playback of the pan around video may not actually pause until the viewpoint of the virtual camera 120A is reached. In another example, a user may view a pan around video of the event location 105 starting from the viewpoint of camera 110D. The pan around video may pan around the event location 105 in a counter-clockwise direction along the dotted lines in FIG. 1 towards the viewpoint of the virtual camera 120C. If the user pause the pan around video when the viewpoint is between the virtual camera 120C and the camera 110C, the playback of the pan around video may not actually pause until the viewpoint of the camera 110C is reached. In one embodiment, after viewing a pan around video, the user may switch back to viewing one of videos and/or virtual videos. For example, the user may provide user input indicating that the user wishes to stop playback of the pan around video and resume playback of a virtual video. The media server may provide frames and/or images from the virtual video, based on the user input.

In one embodiment, the virtual videos and/or the pan around video may have a lower quality than the videos generated by the cameras 110A through 110D. For example, the cameras 110A through 110D may generate videos at a resolution of 1080P. The virtual videos and/or pan around videos may have a lower resolution of 720P. In another example, the virtual video and/or pan around videos may have fewer colors than the videos generated by the cameras 110A through 110D. In a further example, the virtual video and/or pan around videos may have a smaller frame rate (e.g., frames per second) than the videos generated by cameras 110A through 110D.

In one embodiment, the videos, virtual videos, and/or pan around videos may provide a user with certain viewpoints of the event and/or event location 105. The videos, virtual videos, and pan around videos allow a user to simulate a 3D viewing experiences of the event and/or event location. For example, the user can pan around the event and/or event location at certain points in times (e.g., at panning points, as discussed further below). Because the 3D viewing experience is available at certain viewpoints and/or certain time periods (e.g., at panning points) within the videos, a server (e.g., a media server) may simulate the 3D viewing experience without using more resources (e.g., processing power, storage spaces, network bandwidth) because the server may not need to generate a full 3D environment.

Figure 2:
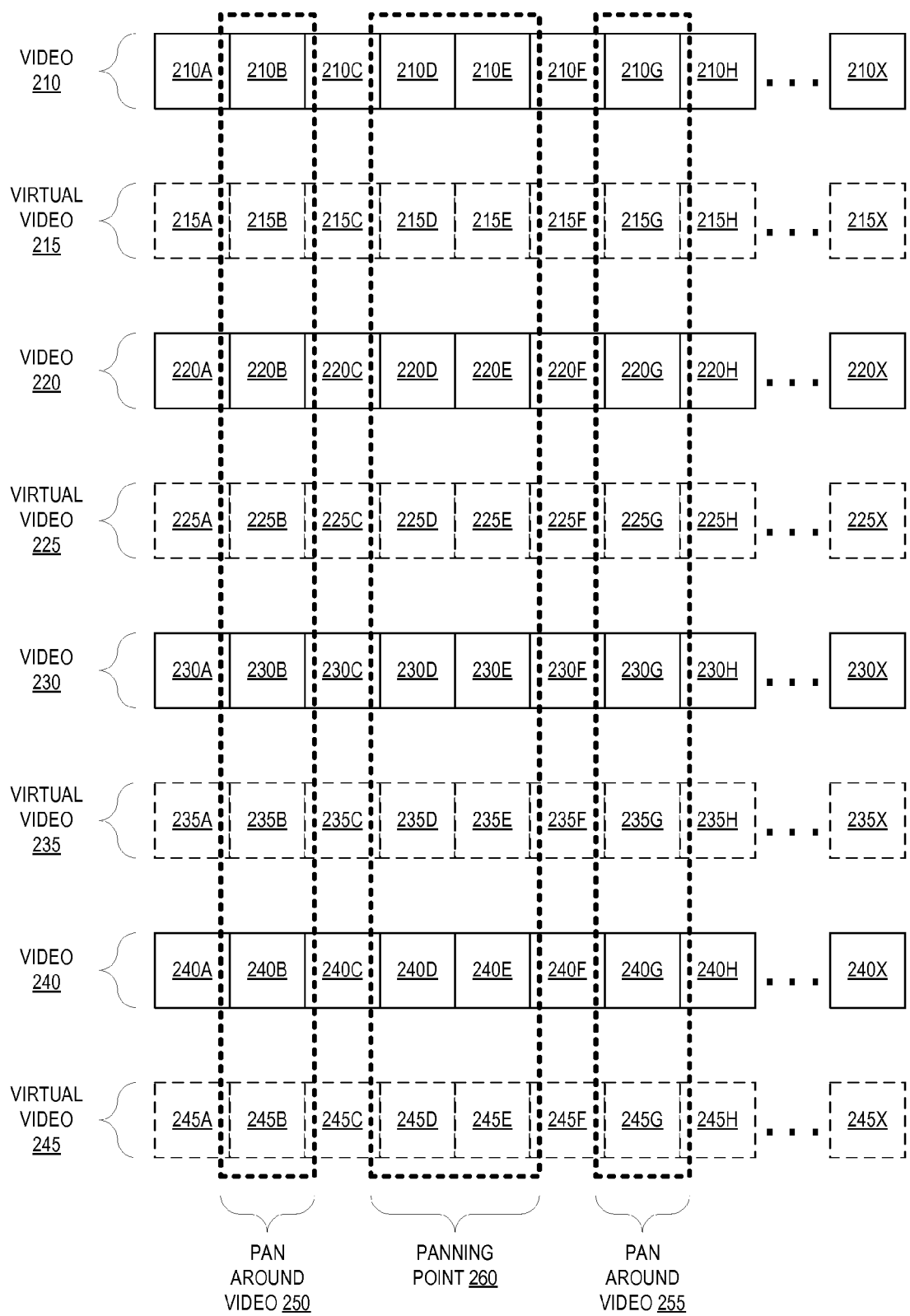
FIG. 2 is a block diagram illustrating videos, virtual videos, and pan around videos, in accordance with one embodiment of the present disclosure.

In one embodiment, the cameras 110A through 110D may capture the videos of the event and/or event location 105 in real time or near real time. For example, the cameras 110A through 110D may provide the captured video (e.g., video stream) to a media server as the event takes place in the event location. The virtual videos and/or pan around videos may also be generated in real time or near real time. For example, a user may pause a video of a live event and may pan around to a different view of the live event (e.g., a view from a virtual camera) and may continue playback of the video of the live event from the different view. A media server may generate the pan around view and the virtual video in real time or near real time to allow the user to pan around and change to different view of the event and/or event location 105. In another example, a user may view a video of an event generated by a physical camera (e.g., camera 110B). While viewing the video, the user may indicate that the user wants to pan towards the right (e.g., towards virtual camera 120A. The media sever may generate a virtual video of the event and/or event location 105 from the viewpoint of virtual camera 120A FIG. 2 is a block diagram illustrating videos 210, 220, 230, and 240, virtual videos 215, 225, 235, and 245, and pan around videos 250 and 255, in accordance with one embodiment of the present disclosure. As discussed above, actual and/or physical cameras may capture, generate, and/or obtain videos of an event location (e.g., event location as illustrated in FIG. 1). Referring back to FIG. 1, camera 110A may capture and/or generate video 210, camera 110B may capture and/or generate video 220, camera 110C may capture and/or generate video 230, and camera 110D may capture and/or generate video 240. Each of the videos 210, 220, 230, and 240 includes multiple frames and/or images. For example, video 210 includes frames 210A through 210X, video 220 includes frames 220A through 220X, etc. Also as discussed above, a media server may generate virtual videos of the event location based on actual videos of the event location. The virtual videos 215, 225, 235, and 245 may be generated based on one or more of the videos 210, 220, 230, and 240. The virtual videos may provide a view and/or viewpoint of the event location from a virtual camera. Referring back to FIG. 1, the virtual video 215 may be from the viewpoint of virtual camera 120A, the virtual video 225 may be from the viewpoint of virtual camera 120B, the virtual video 235 may be from the viewpoint of virtual camera 120C, and the virtual video 245 may be from the viewpoint of virtual camera 120D. Each of the videos 215, 225, 235, and 245 includes multiple frames and/or images. For example, video 215 includes frames 215A through 215X, video 225 includes frames 225A through 225X, etc. In one embodiment, the virtual videos 215 through 245 and the pan around videos 250 and 255 may have a lower quality than one or more of the videos 210 through 240. For example, the virtual videos 215 through 245 may have a lower resolution, lower picture quality, fewer colors, etc., than the video 210.

As discussed above, the media server may identify panning points (e.g., a time, an image, and/or a frame) in the videos 210 through 240 and virtual videos 215 through 245. The media server may generate additional videos (such as pan around videos 250 and 255) that provide the user with the pan around view of the event location 105 at a panning point. Referring to FIG. 2, the media server may identify panning points at frames 210B, 215B, 220B, 225B, 230B, 235B, 240B, and 245B. The panning points at frames 210B, 215B, 220B, 225B, 230B, 235B, 240B, and 245B may be synchronized in time. For example, the panning point at frame 210B may be one minute and eighteen seconds into the video 210, the panning point at frame 215B may be one minute and eighteen seconds into the virtual video 215, the panning point at frame 220B may be one minute and eighteen seconds into the video 220, etc. The media server may generate the pan around video 250 based on the videos 210 through 240 and virtual videos 215 through 245. In one embodiment, the pan around video may includes frames 210B, 215B, 220B, 225B, 230B, 235B, 240B, and 245B from the videos 210 through 240 and virtual videos 215 through 245. In another embodiment, the pan video may include new frames and/or new images generated based on the frames and/or images in the videos 210 through 240 and virtual videos 215 through 245. For example, referring to FIG. 1, the pan around video 250 may include frames and/or images of the event location 105 (at the panning point) that provide viewpoints of the event location 105 from angles between the camera 110C and the virtual camera 120C.

Similarly, the media server may identify panning points at frames 210G, 215G, 220G, 225G, 230G, 235G, 240G, and 245G. The panning points at frames 210G, 215G, 220G, 225G, 230G, 235G, 240G, and 245G may be synchronized in time (e.g., each panning point is at the same time within the videos 210 through 240 and virtual videos 215 through 245). The media server may generate the pan around video 255 based on the videos 210 through 240 and virtual videos 215 through 245. For example, the pan around video may includes frames 210G, 215G, 220G, 225G, 230G, 235G, 240G, and 245G and/or may include new frame and/or new images generated based on the frames and/or images in the videos 210 through 240 and virtual videos 215 through 245.

In one embodiment, the media server may identify panning points (e.g., periods of time) where a user is allowed to pan around between different cameras and/or virtual camera (e.g., change between viewing different videos and/or virtual videos). As illustrated in FIG. 2, the media server may identify panning point 260. During the panning point 260, a user may switch between different videos and/or virtual videos of the event and/or event location. For example, referring back to FIG. 1, the user may be watching the video 220 of the event location 105 (generated by the camera 110B) and the user may be at frame 220D of the video 200. The user may indicate (e.g., by pressing a button on a user interface) that the user wants to pan towards the left towards virtual camera 120B. The media server may begin providing the virtual video 225 to the user starting at frame 225D or 225E. In another embodiment, a user may indicate that the user wants to pan towards a different camera and/or virtual camera before a panning point. For example, referring back to FIG. 1, the user may be watching virtual video 235 (from the viewpoint of virtual camera 120C) and may be at frame 235C in the video 235. At frame 235C, the user may indicate the user wants to pan towards the camera 110D. Because the user has not reached panning point 260 in the video 235, the media server may wait until the user has reached frame 235D in the video 235 (e.g., until the video 235 reaches a panning point). The media server may provide the video 240 to the user (e.g., to a client device of the user) starting at frame 240D or 240E.

In one embodiment, media server may also identify panning points in the pan around videos 250 and 255. The panning points in the pan around videos 250 and 255 may be times, periods of time, frames, and/or images within the pan around videos 250 and 255 where a user may pause the playback of the pan around videos 250 and 255. In one embodiment, the panning points may be images and/or frames that provide a viewpoint of the event location 105 from the viewpoint of a camera and/or a virtual camera. For example, referring back to FIG. 1, the panning points in the pan around video 250 may be frames that provide a viewpoint of the event location from the viewpoint of one of the cameras 110A through 110D and/or virtual cameras 120A through 120D. As illustrated in FIG. 2, the media server may identify panning points at frames 210B, 215B, 220B, 225B, 235B, 240B, and 245B in the pan around video 250. Referring back to FIG. 1, the frame 210B may provide a viewpoint of the event location 105 from the viewpoint of camera 110A, the frame 215B may provide a viewpoint of the event location 105 from the viewpoint of virtual camera 120A, the frame 220B may provide a viewpoint of the event location 105 from the viewpoint of camera 110B, etc.

In one embodiment, a user may provide user input indicating that playback of the pan around video should be stopped and that playback of one of the videos 210 through 240 or virtual videos 215 through 245 should resume. For example, when playing pan around video 255, the user may provide user input pause playback of the pan around video at frame 230G. The user may provide additional input indicating that the user wants to stop playback of the pan around video. The media server may begin providing frames from the video 230 to a media viewer on the client device of the user. For example, the media server may begin providing frames of the video 230 starting from frame 230G.

In one embodiment, the videos generated by actual cameras (e.g., video 210 through 240, virtual videos (e.g., virtual videos 215 through 245) and/or the pan around videos (e.g., pan around video 250 and 255) may also be referred to as video streams. A media server (as illustrated in FIG. 3) may provide the video streams (e.g., the videos, virtual videos, and/or pan around videos) to a client device so that the client device may play the video streams.

FIG. 3 illustrates an example system architecture 300, in accordance with one embodiment of the present disclosure. The system architecture 300 includes cameras 110A through 110D, a data store 310, a media server 330, client devices 340 and 350, coupled to a network 305. Network 305 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The cameras 110A through 110D may be part of a camera architecture as illustrated in FIG. 1. The cameras 110A through 110D may be positioned around an event location (e.g., event location 105 illustrated in FIG. 1) in various layouts and/or positions. Each of the cameras 110A through 110D may be located at a position that provides each camera 110A through 110D with a particular viewpoint of the event location. Each of the cameras 110A through 110D may generate videos and/or images. For example, referring back to FIG. 2, camera 110A generates video 210, camera 110B generates video 220, etc. Each of the videos 210 through 240 may include frames and/or images. For example, video 220 includes frames 220A through 220X.

The media server 330 may be one or more computing devices such as a rackmount server, a router computer, a server computer, a personal computer, a mainframe computer, a laptop computer, a tablet computer, a desktop computer, etc. The media server 330 includes an image module 335. In one embodiment, the image module 335 may analyze videos generated by the cameras 110A through 110D (and stored in part of the video data 311) and may generate one or more virtual videos (as discussed above in conjunction with FIGS. 1 and 2). The one or more virtual videos may be videos of an event location (e.g., event location 105 illustrated in FIG. 1) from the viewpoint of one or more virtual cameras positioned around the event location. In another embodiment, the image module 335 may identify panning points within the videos stored in the video data 311 and the virtual videos stored in the virtual video data 312. The panning points in the videos and/or virtual videos may be synchronized in time. The image module 335 may also generate pan around videos (e.g., additional videos) that provide pan around views around the event location at the panning points (as discussed above in conjunction with FIGS. 1 and 2). The image module 335 may also allow users to pan around an event location during a period of time (e.g., during a panning out) switching between different videos and/or virtual videos based on user input.

The videos 210 through 240 (that are generated by the cameras 110A through 110D) are stored in a data store 310 in the video data 311. Virtual videos generated by the image module 335 (as discussed below) based on the videos 210 through 240 may be stored in the data store 310 in the virtual video data 312. For example, referring back to FIG. 2, the virtual videos 215, 225, 235, and 245 may be stored in the data store 310 in virtual video data 312. Pan around videos generated by the image module 335 (as discussed below) based on the videos 210 through 240 and/or virtual videos may be stored in the data store 310 in the pan around video data 313. For example, referring back to FIG. 2, the pan around videos 250 and 255 may be stored in the data store 310 in pan around video data 313. In one embodiment, the data store 310 may be a memory (e.g., random access memory), a cache, a drive (e.g., a hard drive), a flash drive, a database system, or another type of component or device capable of storing data. The data store 310 may also include multiple storage components (e.g., multiple drives or multiple databases) that may also span multiple computing devices (e.g., multiple server computers). In one embodiment, the data store 310 may include videos, virtual videos, pan around videos of multiple events and/or event locations. For example, the data store 310 may include videos, virtual videos, pan around videos of a football game, a press conference, and/or a political debate.

In one embodiment, the image module may receive requests from client device 340 and/or 350 (e.g., receive requests from the media viewers 341 and/or 351) to play videos, virtual videos, pan around videos of different events and/or different locations. The image module 335 may receive data indicative an event and/or event location from the client device 340 and/or 350. The image module 335 may provide one or more of the videos, virtual videos, pan around videos for the event and/or event location to the client device 340 and/or 350. In one embodiment, the image module 335 may receive user input indicating that a user wishes to pan around an event and/or event location during playback of a video and/or virtual video. The image module 335 may identify a video and/or virtual video that corresponds to the viewpoint that the user wants to change to (e.g., pan to). The image module 335 may switch to the identified video and/or virtual video at a next panning point within the video and/or virtual video (as discussed above in conjunction with FIG. 2). In another embodiment, the image module 335 may receive data (e.g., user input) indicating that a user wishes to pause playback of a video and/or a virtual video. Based on the user input, the image module 335 may pause the playback of the video and/or virtual video (e.g., may stop providing or transmitting frames and/or images of the video and/or virtual video) at the next panning point in the video and/or virtual video. The image module 335 may also receive additional data (e.g., additional user input) indicating that the user wants to pan around the event location at the panning point. Based on the additional user input, the image module 335 may provide the pan around video generated for the panning point, to the client device 340 and/or 350.

In a further embodiment, image module 335 may also receive data (e.g., user input) indicating that a user wishes to pause playback of the pan around video. The image module 335 may pause the playback of the pan around video (e.g., may stop providing or transmitting frames and/or images of the pan around video) at the next panning point in the pan around video. In one embodiment, the image module 335 may receive user input indicating that playback of a pan around video should be stopped and that playback of one of the videos and/or virtual videos should resume. For example, referring back to FIG. 2, when playing pan around video 250, the user may provide user input indicating that the user wants to stop playback of the pan around video pause at frame 225B. The image module 335 may begin providing frames from the virtual video 225 to a media viewer on the client device of the user. For example, the image module 335 may begin providing frames of the virtual video 225 starting from frame 225B.

In one embodiment, the image module 335 may also provide media viewers including a GUI to the client device 340 and/or 350. For example, the image module 335 may provide a media viewer that includes the GUI 200 illustrated in FIG. 2. In one embodiment, the image module 335 may provide an embedded media viewer (e.g., a Flash® player or an HTML5 player embedded in a web page) to the client device 340 and/or 350. In another embodiment, the image module 335 may provide a standalone media viewer (e.g., a media player application) to the client device 340 and/or 350. The image module 335 may receive user input from a user via the GUI that is part of the media viewer. For example, the image module 335 may receive user input indicating that the user wants to pause playback of a video. The image module 335 may stop providing images to the client device 340 and/or 350. In another example, the image module 335 may receive user input (from the media viewer 341 and/or 351) indicating that the user wants to pan around the event location. The image module 335 may identify generate a pan around video for the panning point and may provide the pan around video to the client device 340 and/or 350 (e.g., to the media viewer 341 and/or 351). In another example, the image module 335 may receive user input indicating that the user wants to pan around during playback of a video. The image module may identify a virtual video and/or video for the viewpoint that cthe user wishes to pan around to and may provide the identified video and/or virtual video to the client device 350 and/or 350 starting at the next panning point in the identified video and/or virtual video.

In one embodiment, the media server 330 may include may use an adaptive bit rate streaming architecture to provide (e.g., stream) the videos (e.g., videos, virtual videos, pan around videos) the client devices 340 and/or 350. Generally, an adaptive bit rate streaming architecture may dynamically provide different qualities (e.g., different bit rates) and different portions of a video (e.g., video stream) to client devices. Examples of different adaptive bit rate streaming architectures include, but are not limited to, Dynamic Adaptive Streaming over Hypertext Transfer Protocol (DASH), HTTP Live Streaming (HLS), etc.

The client devices 340 and 350 may each include computing devices such as personal computers (PCs), laptops, mobile phones, smart phones, tablet computers, netbook computers etc. Client device 340 includes media viewer 341 and client device 350 includes media viewer 351. In one embodiment, the media viewers 341 and/or 351 may be applications that allow users to view content, such as images, videos, web pages, documents, etc. For example, the media viewer 341 may be a web browser that can access, retrieve, present, and/or navigate content (e.g., web pages such as Hyper Text Markup Language (HTML) pages, digital media items, etc.) served by a web server. The media viewer 341 may render, display, and/or present the content (e.g., a web page, a media player) to a user. The media viewer 341 may also display an embedded media player (e.g., a Flash® player or an HTML5 player) that is embedded in a web page (e.g., a web page that may provide information about a product sold by an online merchant). In another example, the media viewer 341 and/or 351 may be a standalone application that allows users to view digital media items (e.g., digital videos, digital images, electronic books, etc.). The media viewer 341 and 351 may be provided to the client devices 350 and 340 by the media server 330. For example, the media viewer 341 may be an embedded media player that is embedded in a web page provided by the media server 330. In another example, the media viewer 351 may an application that is downloaded from the media server 330.

Figure 4:
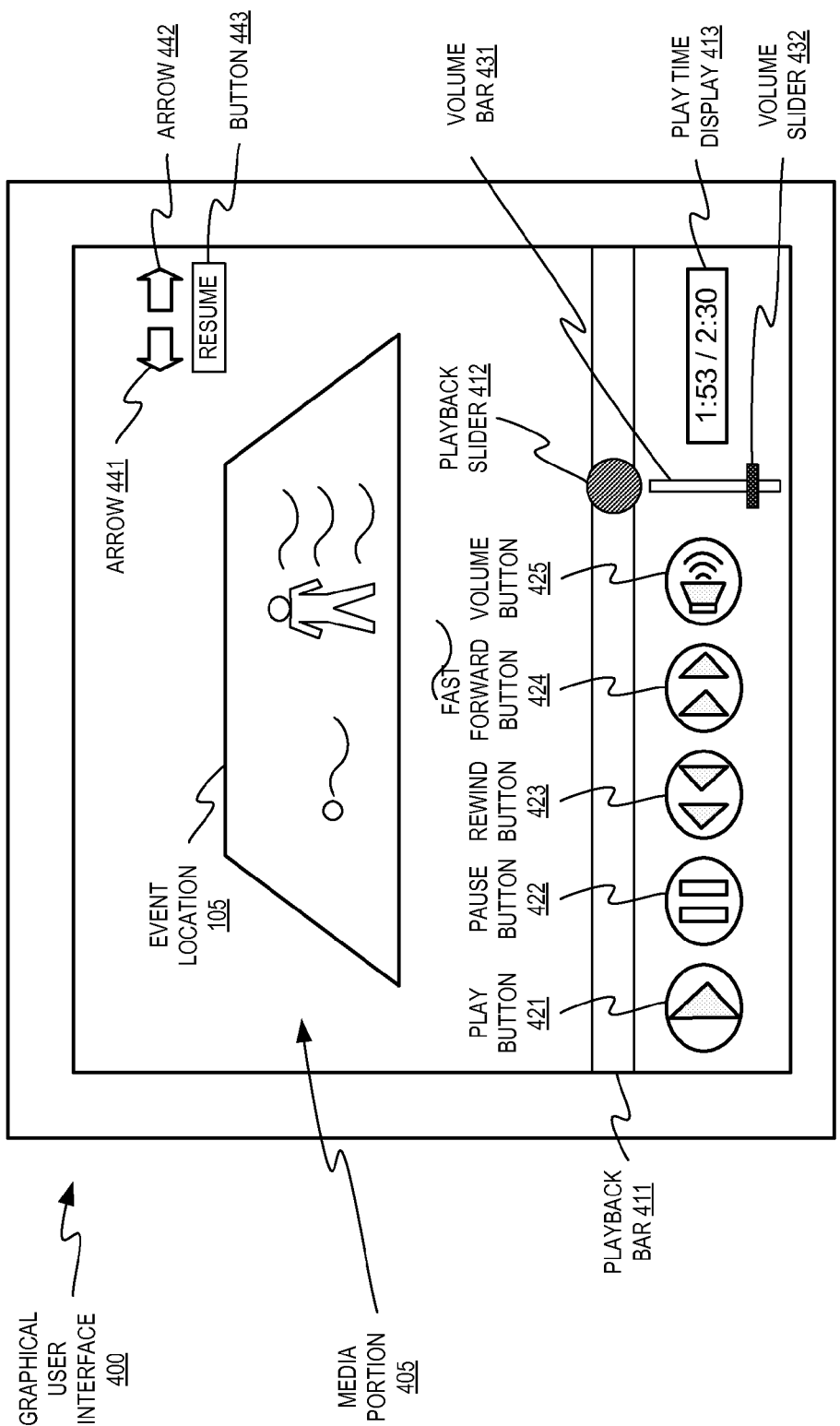
FIG. 4 is a diagram illustrating an example graphical user interface (GUI) in accordance with one embodiment of the present disclosure.

FIG. 4 is a diagram illustrating an example graphical user interface (GUI) 400 in accordance with one embodiment of the present disclosure. In one embodiment, the GUI 400 may be part of a media viewer provided by a media server (e.g., media server as illustrated and discussed below in conjunction with FIG. 3). For example, the GUI 400 may be part of a media viewer that is embedded in a web page (e.g., an embedded media viewer such as a Flash® player or a hypertext markup language-5 (HTML5) player) and the GUI 400 may be rendered by a web browser executing on a client device. In another embodiment, the GUI 400 may be part of a media viewer that may be separate from a web page (e.g., may be a standalone media viewer). For example, the media viewer may be a separate application that is executing on the client device.

The GUI 400 includes media viewer controls which may be used to control the playback/display of the videos, virtual videos, and/or pan around videos (of the event location 105) or of other media items (e.g., other digital videos or digital music). The media viewer controls include a play button 421, a pause button 422, a rewind button 423, a fast forward button 424, and a volume button 425. The play button 421 may allow a user to begin and/or restart playback of the videos, virtual videos, and/or pan around videos. The pause button may allow a user to pause and/or un-pause playback of the videos, virtual videos, and/or pan around videos. The rewind button 423 may allow a user to rewind playback, move and/or skip to an earlier point in time in the videos, virtual videos, and/or pan around videos. The fast forward button 424 may allow a user to fast forward playback, move, and/or skip to a later point in time in the videos, virtual videos, and/or pan around videos. The GUI 400 also includes a play time display 413, a playback bar 411 and a playback slider 412. The play time display 413 may display a current play time and/or a total play time for the videos, virtual videos, and/or pan around videos. For example, a total play time (e.g., the total length) of a video, virtual video, and/or pan around video may be 2 minutes and 30 seconds (e.g., 2:30). The current play time may be current time/position in the playback of digital media item (e.g., 1 minute and 53 seconds or 1:53). Playback slider 412 is positioned on a region of a playback bar 411 that corresponds to the current play time (e.g., 1:53). The playback slider 412 may be adjusted (e.g., dragged) to any other region of the playback bar 411 to adjust the current play time shown in the play time display 413.

The GUI 400 includes a media portion 405 that may display a video, virtual video, and/or pan around video of the event location 105. For example, media portion 405 may be the portion of the GUI 400 where the video, virtual video, or pan around video is played. The media portion 405 may also play other types of videos, images, music, and/or other media items. The media portion 405 also includes arrows 441 through 442. In one embodiment, the user may use the arrows 441 through 442 to pan around an event and/or event location during playback of a video and/or virtual video. For example, referring back to FIG. 2, the user may be watching video 210 and may be at frame 210C in video 210. The user may click the arrow 441 and the media server may begin providing the virtual video 215 to the client device starting at frame 215D (e.g., starting at the next panning point). In another embodiment, when the user pauses playback of a video and/or a virtual video, the user may use the arrows 441 through 442 to initiate playback of a pan around video of the event location 105. For example, referring back to FIG. 1, when the user clicks the arrow 441 the media viewer may send data indicating that the user wants to view a pan around video of the event location 105 that is associated current panning point. The media server may identify the pan around video and may provide images and/or frame from a pan around video that moves in a counter-clockwise direction to the media viewer. In another example, when the user clocks the arrow 442, the media sever may identify a pan around video that moves in a clockwise direction to the media view. The GUI 400 also includes button 443. When a user actives and/or clicks on button 443, this may indicate that the user wants to stop playback of the pan around video and begin and/or resume playback of a video and/or virtual video. In one embodiment (not shown in the figures), the GUI 400 may also include buttons (e.g., magnifying glass buttons) that allow a user to zoom in and/or zoom out during the playback of the videos. This may allow a user to get a closer view and/or a farther view of the event location 105.

The volume button 425 may allow user to control the volume of sounds, music, and/or other audible noises in the videos. In one embodiment, the volume bar 431 and the volume slider 432 may be displayed when the user clicks and/or activates the volume button 425. For example, the volume bar 431 and the volume slider 432 may not be initially displayed in the GUI 400. After the user clicks the volume button 425, the volume bar 431 and the volume slider 432 may be displayed. The user may move and/or slide the volume slider 432 up and/or down along the volume bar 231 to control the volume of sounds, music, and/or other audible noises in the videos. For example, the user may slide the volume slider 432 up to increase the volume or may slide volume slider 432 down to decrease the volume.

Figure 5:
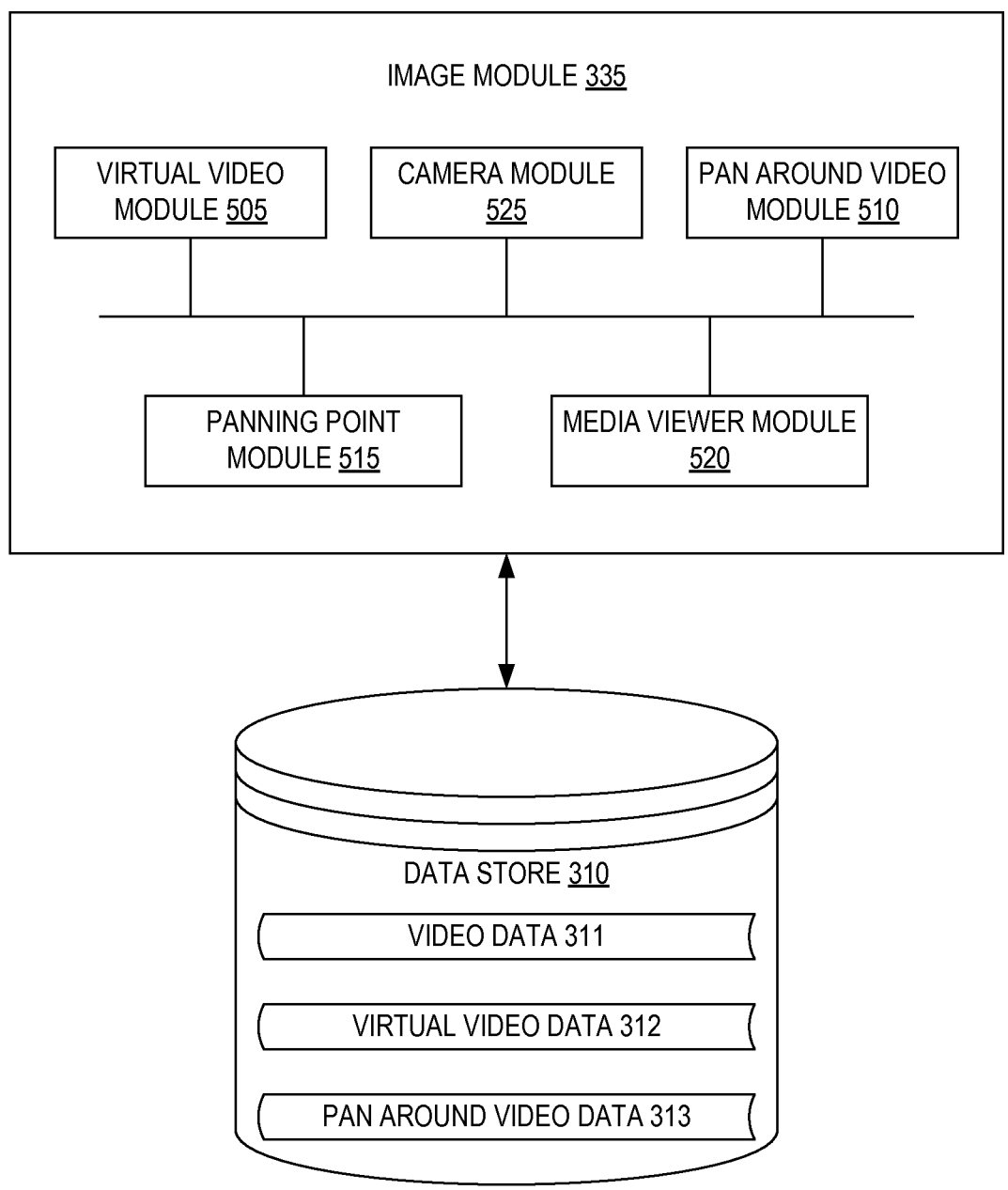
FIG. 5 is a block diagram illustrating an image module, in accordance with one embodiment of the present disclosure.

FIG. 5 is a block diagram illustrating an image module, in accordance with one embodiment of the present disclosure. The image module 335 includes a virtual video module 505, a pan around video module 510, a panning point module 515, a media viewer module 520, and a camera module 525. More or less components may be included in the image module 335 without loss of generality. For example, two of the modules may be combined into a single module, or one of the modules may be divided into two or more modules. In one embodiment, one or more of the modules may reside on different computing devices (e.g., different server computers).

The image module 335 is communicatively coupled to the data store 310. For example, the image module 335 may be coupled to the data store 310 via a network (e.g., via network 505 as illustrated in FIG. 3). In another example, the image module 335 may be coupled directly to a server where the image module 335 resides (e.g., may be directly coupled to media server 330). The data store 310 may be a memory (e.g., random access memory), a cache, a drive (e.g., a hard drive), a flash drive, a database system, or another type of component or device capable of storing data. The data store 310 may also include multiple storage components (e.g., multiple drives or multiple databases) that may also span multiple computing devices (e.g., multiple server computers). As discussed above in conjunction with FIG. 4, the data store 310 includes video data 311, virtual video data 312, and pan around video data 313.

In one embodiment, the camera module 525 may communicate with cameras from a camera architecture (as illustrated in FIG. 1). The camera module 525 may receives videos (e.g., sequences of images and/or frames) from the cameras in the camera architecture and may store the image arrays in the data store 310. For example, referring back to FIGS. 1 and 2, the camera module 525 may receive videos (e.g., image arrays) generated by the cameras 110A through 110D. The camera module 525 may store the videos in the video data 311.

In one embodiment, the virtual video module 505 may generates virtual videos of the event and/or event location from the viewpoints of one or more virtual cameras positioned around the event and/or event location. For example, referring to FIG. 1, the virtual video module 505 may generate a virtual video of the event location 105 from the viewpoint of virtual camera 120C. The virtual video module 505 may generate the virtual videos based on one or more videos captured by physical (e.g., actual cameras).

In one embodiment, the panning point module 515 may identify panning points within the videos and/or virtual videos (stored in video data 311 and/or virtual video data 312). The panning point module 515 may identify panning points based on user input. The panning point module 515 may also identify panning points based on a period of time or a number of frames. For example, the panning point module 515 may identify a panning point every ten seconds or every twenty frames. The panning point module 515 may also use any number of different algorithms, functions, operations, and/or metrics to identify panning points. For example, the panning point module 515 may use a scene detection algorithm to identify panning points. The panning point module 515 may also identify panning points within pan around videos. For example, the panning point module 515 may determine that each frame in the panning point video that provides a view of the event location from the viewpoint of a physical camera or a virtual camera is a panning point.

In one embodiment, the pan around video module 510 may generate pan around videos of the event and/or event location. For example, the pan around video module 510 may generate pan around videos at panning points in the videos and/or virtual videos. The pan around video module 510 may use actual frames and/or images from the videos and/or virtual videos in the pan around videos. The pan around video module 510 may also generate new frames based on the actual frames and/or images from the videos and/or virtual videos in the pan around videos.

Figure 6:
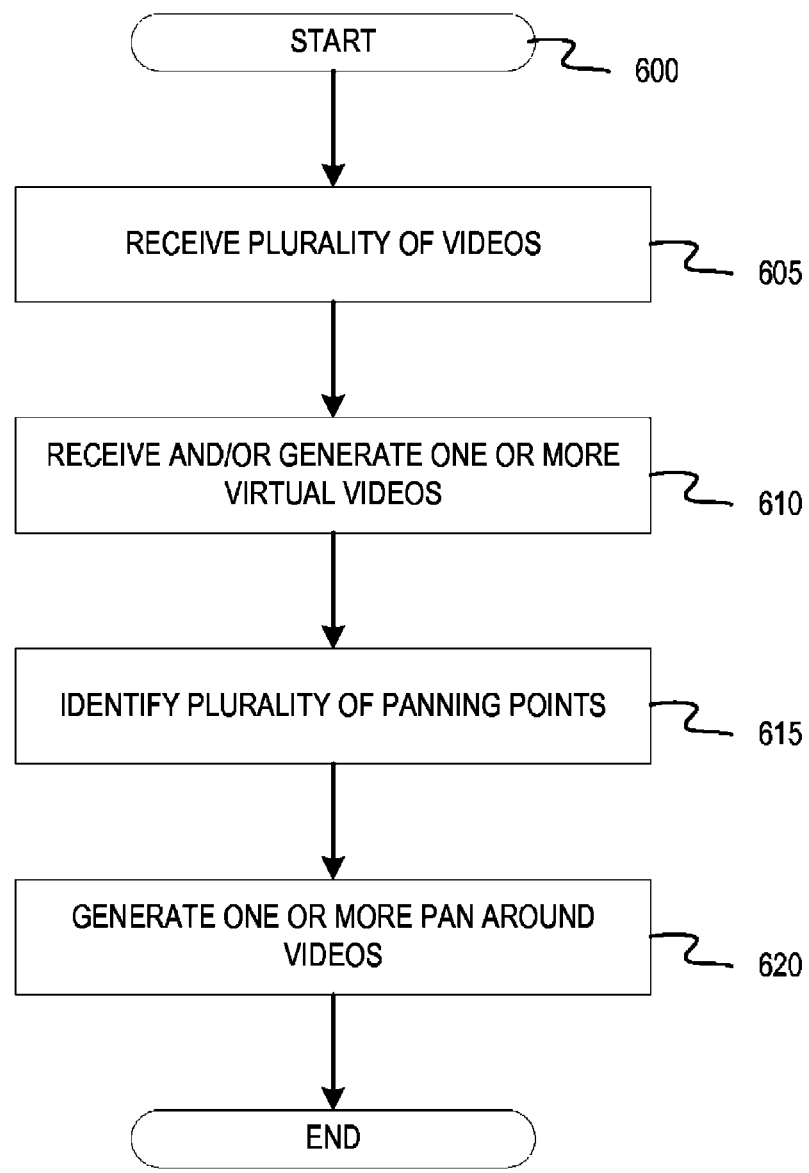
FIG. 6 is a flow diagram illustrating a method of generating virtual videos, in accordance with one embodiment of the present disclosure.
Figure 7A:
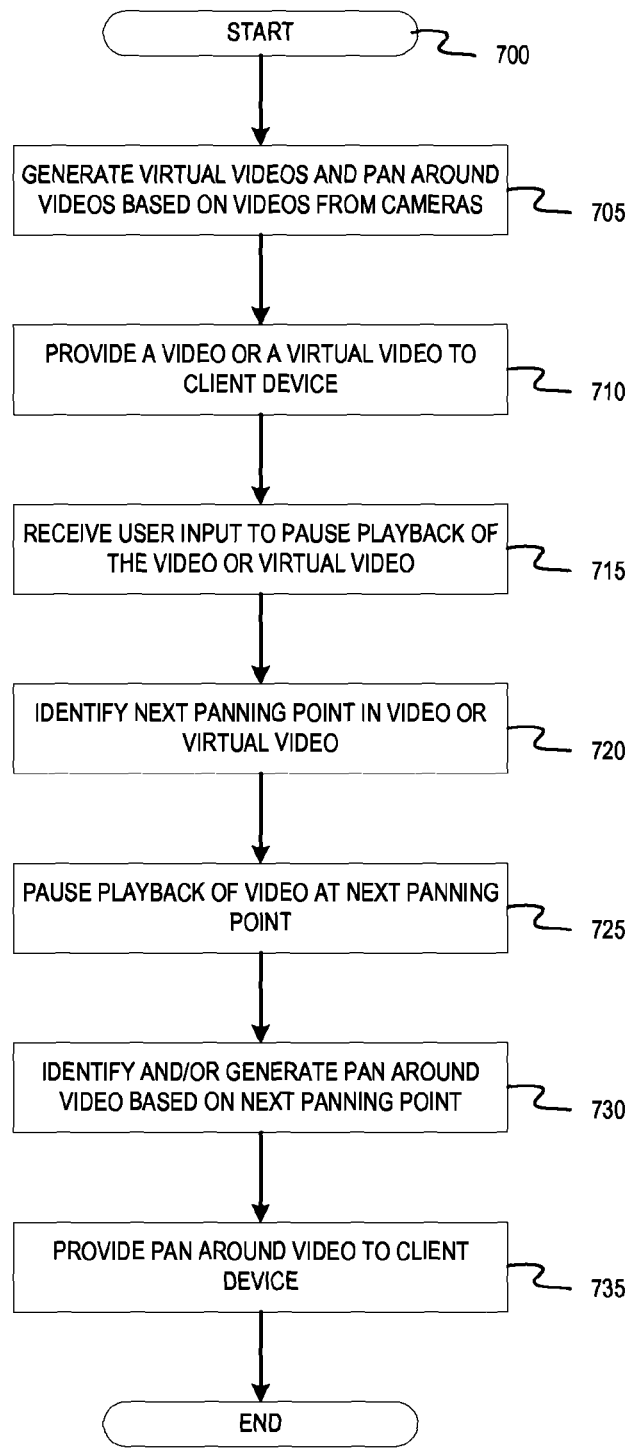
FIG. 7A is a flow diagram illustrating a method of providing videos to a client device, in accordance with one embodiment of the present disclosure.
Figure 7B:
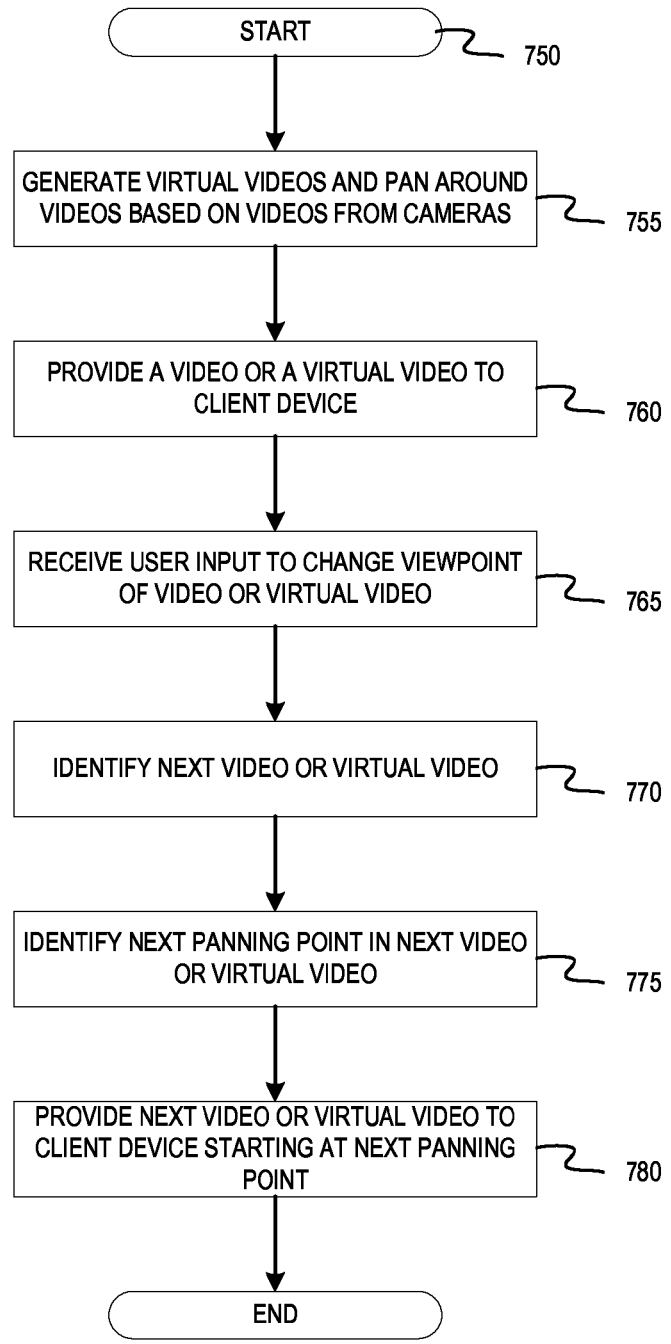
FIG. 7B is a flow diagram illustrating a method of providing videos to a client device, in accordance with another embodiment of the present disclosure.
Figure 8:
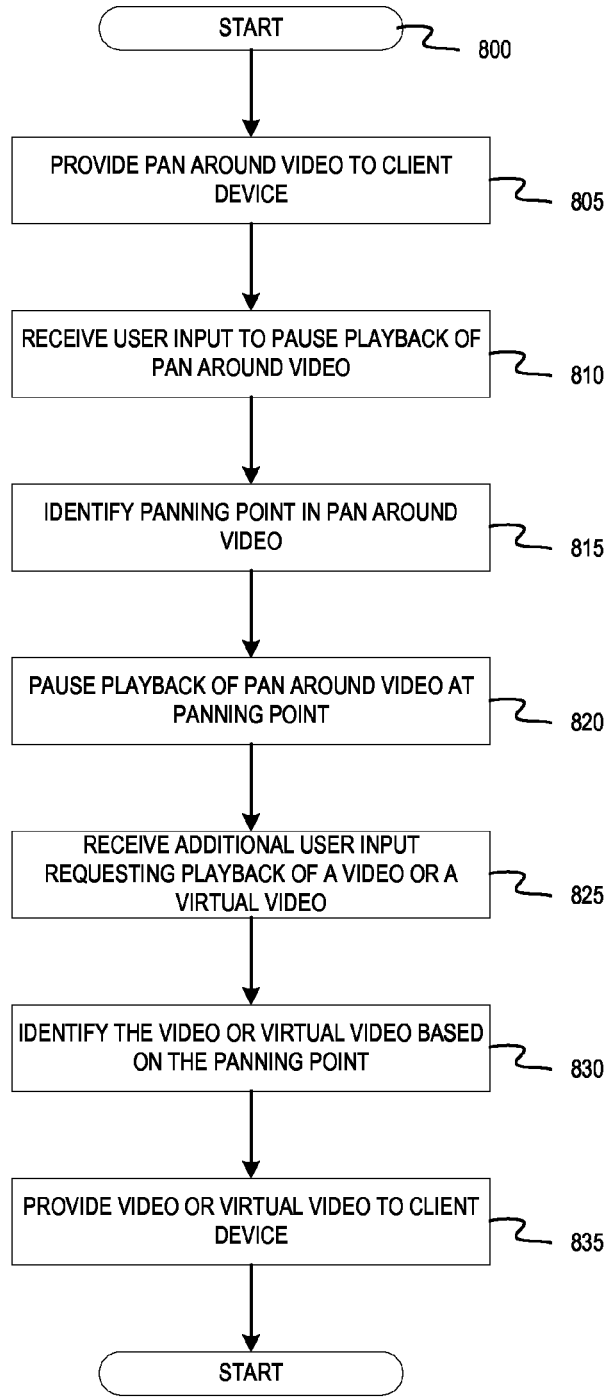
FIG. 8 is a flow diagram illustrating a method of providing videos to a client device, in accordance with a further embodiment of the present disclosure.

FIGS. 6-8 are flow diagrams illustrating methods of generating vides and providing videos to a client device. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In one embodiment, the media viewer module 520 may provide a media viewer to a client device (e.g., client device 340 illustrated in FIG. 3). For example, the media viewer module 520 may provide an install file, a software component/module, a binary file, etc., to the client device and the client device may install the media viewer on the client device. In another example, the media viewer module 520 may provide a web page including an embedded media viewer (e.g., a Flash® player, an HTML5 player, etc.) to a client. The client device may use the embedded media viewer to view the videos, virtual videos, and pan around videos of the event location by accessing the web page.

FIG. 6 is a flow diagram illustrating a method of generating virtual videos, in accordance with one embodiment of the present disclosure. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by an image module, as illustrated in FIGS. 3 and 5.

Referring to FIG. 6, the method 600 begins at block 605 where the method 600 receives a plurality of videos. For example, the method 600 may receive videos generated by actual cameras (e.g., cameras 110A through 110D illustrated in FIG. 1). At block 610, the method 600 may receive and/or may generate virtual videos. For example, the method 600 may receive virtual videos generated by another computing device (e.g., another server) based on the plurality of videos. In another example, the method 600 may generate the virtual videos based on the plurality of videos. The method 600 may identify a plurality to of panning points in the videos and virtual videos (block 615). For example, the method 600 may identify panning points based on user input identifying the panning points (e.g., based on user input identifying important times and/or parts of an event). In another example, the method 600 may identify panning points every other I-frame in the videos as panning points. In a further example, the method 600 may identify a panning point every 10 seconds. At block 620, the method 600 generates one or more pan around videos, based on one or more of the plurality of panning points. For example, referring back to FIG. 2, the method 600 may generate pan around video 250 based on one or more of the panning points at frames, 210B, 215B, 220B, 230B, 235B, 240B, or 245B. After block 620, the method 600 ends.

FIG. 7A is a flow diagram illustrating a method 700 of providing videos to a client device, in accordance with one embodiment of the present disclosure. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by an image module, as illustrated in FIGS. 3 and 5.

Referring to FIG. 7A, the method 700 begins at block 705 where the method 700 generates virtual videos and pan around videos based on actual videos of an event and/or event location. For example, referring back to FIG. 2, the method 700 may generate virtual videos 215, 225, 235, and 245 based on videos 210, 220, 230, and 240. The method 700 may also generate pan around videos based on panning points in the videos 210, 215, 220, 225, 230, 235, 240, and 245. At block 710, the method provides a video or a virtual video to a client device. For example, referring to FIG. 1, a user may use a client device to view videos of an event and/or event location 105 and may select a video from the viewpoint of virtual camera 120C. The method 700 may provide the video from the viewpoint of virtual camera 120C to the client device. The method 700 receives user input to pause playback of the video or virtual video. The method 700 identifies the next panning point in the video or virtual video (at block 720) and pauses playback of the video at the next panning point (at block 725). For example, referring back to FIG. 2, the method 700 may identify a panning point at frame 235G in the virtual video 235 and may pause playback of the virtual video 235 at frame 235G. At block 730, the method 700 may identify a pan around video based on the next panning point. For example, referring back to FIG. 2, the method 700 may identify the pan around video 255 based on the panning point at frame 235G. In another example, the method 700 may generate the pan around video, based on the panning point (as discussed above in conjunction with FIG. 2). The method 700 provides the pan around video to the client device at block 735. After block 735, the method 700 ends.

FIG. 7B is a flow diagram illustrating a method 750 of providing videos to a client device, in accordance with another embodiment of the present disclosure. The method 750 may be performed by processing logic that comprises hardware (e.g., circuitry, dedicated logic, programmable logic, microcode, etc.), software (e.g., instructions run on a processor to perform hardware simulation), or a combination thereof. In one embodiment, method 750 may be performed by an image module, as illustrated in FIGS. 3 and 5.

Referring to FIG. 7A, the method 750 begins at block 755 where the method 750 generates virtual videos and pan around videos based on actual videos of an event and/or event location. At block 760, the method provides a video or a virtual video to a client device. For example, referring to FIG. 1, a user may use a client device to view videos of an event and/or event location 105 and may select a video from the viewpoint of virtual camera 120C. The method 750 may provide the video from the viewpoint of virtual camera 120C to the client device. The method 750 receives user input to change the viewpoint of the video or virtual video at block 765. For example, the method 750 may receive user input indicating that the user wants to pan around an event and/or event location. At block 770, the method 750 identifies a next video or virtual video based on the user input. For example, if the user indicates that the user wants to pan to the left, the method 750 may identify a video or virtual video from a camera or virtual video camera to the left of the current viewpoint. At block 775, the method 750 may identify a next panning point in the video or virtual video. At block 780, the method 750 provides the next video or virtual video to the client device starting at the next point. After block 780, the method 750 ends.

FIG. 8 is a flow diagram illustrating a method 800 of providing videos to a client device, in accordance with a further embodiment of the present disclosure. The method 800 may be performed by processing logic that comprises hardware (e.g., circuitry, dedicated logic, programmable logic, microcode, etc.), software (e.g., instructions run on a processor to perform hardware simulation), or a combination thereof. In one embodiment, method 800 may be performed by an image module, as illustrated in FIGS. 3 and 5.

Referring to FIG. 8, the method 800 begins at block 805 where the method 800 provides a pan around video to a client device. At block 810, the method 800 receives user input to pause playback of the pan around video. The method 800 identifies a panning point in the pan around video (block 815). For example, referring back to FIG. 2, pan around video 250 is provide to a client device, the method 800 may identify frame 220B as a next panning point when the user hits a pause button. At block 820, the method 800 pauses playback of the pan around video at the panning point. The method 800 receives additional user input requesting playback of a video or a virtual video at block 825. For example, the method 800 may receive user input indicating that the user is done watching the pan around video and wants to continue watching one of the videos and/or virtual videos. At block 830, the method 800 identifies a video or virtual video based on the panning point. For example, referring back to FIG. 2, if the user paused playback of the pan around video at frame 220B, the method 800 may identify the video 220. The method 800 provides the video or virtual video to the client device at block 835. After block 835, the method 800 ends.

Figure 9:
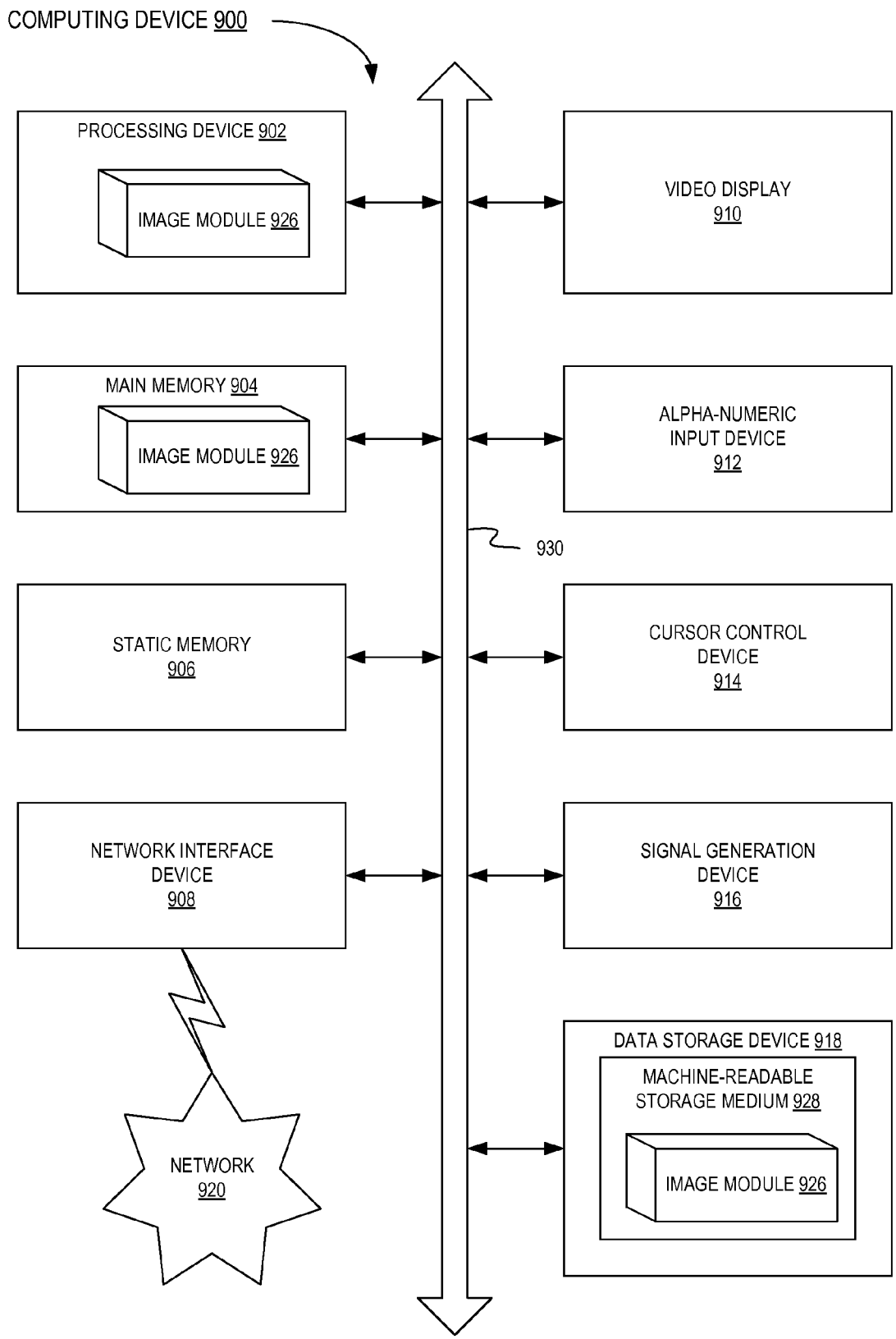
FIG. 9 is a block diagram of an example computing device that may perform one or more of the operations described herein.

FIG. 9 illustrates a diagrammatic representation of a machine in the example form of a computing device 900 within which a set of instructions, for causing the machine to perform any one or more of the methodologies discussed herein, may be executed. The computing device 900 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute image module 926 for performing the operations and steps discussed herein.

The computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 916 (e.g., a speaker). In one embodiment, the video display unit 910, the alphanumeric input device 912, and the cursor control device 914 may be combined into a single component or device (e.g., an LCD touch screen).

The data storage device 918 may include a computer-readable storage medium 928 on which is stored one or more sets of instructions (e.g., image module 926) embodying any one or more of the methodologies or functions described herein. The image module 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 920 via the network interface device 908.

While the computer-readable storage medium 928 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "receiving," "generating," "providing," "pausing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving a plurality of videos of an event, wherein the plurality of videos are associated with a plurality of viewpoints of the event;
   receiving one or more virtual videos of the event, wherein the one or more virtual videos are associated with one or more of the plurality of viewpoints of the event;
   identifying, by a processing device, a plurality of panning points, wherein each panning point in the plurality of panning points is associated with one video from the plurality of videos or one virtual video from the one or more virtual videos; and
   generating, by the processing device, one or more pan around videos of the event based on the plurality of identified panning points using the plurality of videos and the one or more virtual videos of the event, wherein each of the one or more pan around videos pans around the event at a corresponding panning point of the plurality of identified panning points, and wherein a respective pan around video is provided for a subsequent presentation to a user watching one of the plurality of videos or one of the one or more virtual videos in response to the user pausing playback of the video.

2. The method of claim 1, wherein receiving the one or more virtual videos of the event comprises:
generating the one or more virtual videos of the event based on the plurality of videos of the event.

3. The method of claim 1, wherein the plurality of videos and the one or more virtual videos of the event are synchronized in time.

4. The method of claim 1, wherein each panning point in the plurality of panning points is at a same point in time in the plurality of videos and the one or more virtual videos.

5. The method of claim 1, further comprising:
providing a first video from the plurality of videos or a first virtual video from the one or more virtual videos to a client device;
receiving user input indicating a user request to change to a different viewpoint of the event;
identifying a next video or a next virtual video based on the user input;
identifying a next panning point in the next video or the next virtual video; and
providing the next video or the next virtual video to the client device at the next panning point.

6. The method of claim 1, further comprising:
providing a first video from the plurality of videos or a first virtual video from the one or more virtual videos to a client device;
receiving user input indicating that playback of the first video or the first virtual video should be paused;
identifying a first panning point from the plurality of panning points; and
pausing playback of the video at the next panning point.

7. The method of claim 6, further comprising:
identifying a first pan around video from the one or more pan around videos based on the first panning point; and
providing the first pan around video to the client device.

8. The method of claim 7, further comprising:
receiving a second user input indicating that playback of the first pan around video should be paused;
identifying a second panning point in the pan around video;
pausing playback of the pan around video at the second panning point;
receiving a third user input requesting playback of a second video from the plurality of videos or a second virtual video from the one or more virtual videos;
identifying the second video or the second virtual video based on the second panning point; and
providing the second video or second virtual video to the client device.

9. The method of claim 1, wherein the one or more pan around videos and the one or more virtual videos have a lower quality than the plurality of videos.

10. The method of claim 1, wherein generating one or more pan around videos comprises:
generating a first pan around video that provides a view of the event that pans around the event in a clockwise direction; and
generating a second pan around video that provides a view of the event that pans around the event in a counter-clockwise direction.

11. The method of claim 1, wherein each panning point in the plurality of panning points comprises an intra-code frame (I-frame).

12. The method of claim 1, wherein the plurality of panning points is identified based on user input.

13. An apparatus comprising:
a memory to store data;
a processing device, coupled to the memory, the processing device to:
receive a plurality of videos of an event, wherein the plurality of videos are associated with a plurality of viewpoints of the event;
receive one or more virtual videos of the event, wherein the one or more virtual videos are associated with one or more of the plurality of viewpoints of the event;
identify a plurality of panning points, wherein each panning point in the plurality of panning points is associated with one video from the plurality of videos or one virtual video from the one or more virtual videos; and
generate one or more pan around videos of the event based on the plurality of identified panning points using the plurality of videos and the one or more virtual videos of the event, wherein each of the one or more pan around videos pans around the event at a corresponding panning point of the plurality of identified panning points, and wherein a respective pan around video is provided for a subsequent presentation to a user watching one of the plurality of videos or one of the one or more virtual videos in response to the user pausing playback of the video.

14. The apparatus of claim 13, wherein each panning point in the plurality of panning points is at a same point in time in the plurality of videos and the one or more virtual videos.

15. The apparatus of claim 13, wherein the processing device is further to:
provide a first video from the plurality of videos or a first virtual video from the one or more virtual videos to a client device;
receive user input indicating a user request to change to a different viewpoint of the event;
identify a next video or a next virtual video based on the user input;
identify a next panning point in the next video or the next virtual video; and
provide the next video or the next virtual video to the client device at the next panning point.

16. The apparatus of claim 13, wherein the processing device is further to:
provide a first video from the plurality of videos or a first virtual video from the one or more virtual videos to a client device;
receive user input indicating that playback of the first video or the first virtual video should be paused;
identify a first panning point from the plurality of panning points; and
pause playback of the video at the next panning point.

17. The apparatus of claim 16, wherein the processing device is further to:
identify a first pan around video from the one or more pan around videos based on the first panning point; and
provide the first pan around video to the client device.

18. The apparatus of claim 17, wherein the processing device is further to:
receive a second user input indicating that playback of the first pan around video should be paused;
identify a second panning point in the pan around video;
pause playback of the pan around video at the second panning point;
receive a third user input requesting playback of a second video from the plurality of videos or a second virtual video from the one or more virtual videos;

identify the second video or the second virtual video based on the second panning point; and provide the second video or second virtual video to the client device.

19. The apparatus of claim 13, wherein the processing device generates one or more pan around videos by:

generating a first pan around video that provides a view of the event that pans around the event in a clockwise direction; and generating a second pan around video that provides a view of the event that pans around the event in a counter-clockwise direction.

20. A non-transitory computer readable storage medium having instructions that, when executed by a processing device, cause the processing device to:

receive a plurality of videos of an event, wherein the plurality of videos are associated with a plurality of viewpoints of the event;

receive one or more virtual videos of the event, wherein the one or more virtual videos are associated with one or more of the plurality of viewpoints of the event;

identify a plurality of panning points, wherein each panning point in the plurality of panning points is associated with one video from the plurality of videos or one virtual video from the one or more virtual videos; and generate one or more pan around videos of the event based on the plurality of identified panning points using the plurality of videos and the one or more virtual videos of the event, wherein each of the one or more pan around videos pans around the event at a corresponding panning point of the plurality of identified panning points, and wherein a respective pan around video is provided for a subsequent presentation to a user watching one of the plurality of videos or one of the one or more virtual videos in response to the user pausing playback of the video.

21. The non-transitory computer readable storage medium of claim 20, wherein the processing device further to:

provide a first video from the plurality of videos or a first virtual video from the one or more virtual videos to a client device;

receive user input indicating a user request to change to a different viewpoint of the event;

identify a next video or a next virtual video based on the user input;

identify a next panning point in the next video or the next virtual video; and provide the next video or the next virtual video to the client device at the next panning point.

22. The non-transitory computer readable storage medium of claim 20, wherein the processing device further to:

provide a first video from the plurality of videos or a first virtual video from the one or more virtual videos to a client device;

receive user input indicating that playback of the first video or the first virtual video should be paused;

identify a first panning point from the plurality of panning points; and pause playback of the video at the next panning point.

23. The non-transitory computer readable storage medium of claim 22, wherein the processing device further to:

identify a first pan around video from the one or more pan around videos based on the first panning point; and provide the first pan around video to the client device.

24. The non-transitory computer readable storage medium of claim 23, wherein the processing device further to:

receive a second user input indicating that playback of the first pan around video should be paused;

identify a second panning point in the pan around video;

pause playback of the pan around video at the second panning point;

receive a third user input requesting playback of a second video from the plurality of videos or a second virtual video from the one or more virtual videos;

identify the second video or the second virtual video based on the second panning point; and provide the second video or second virtual video to the client device.

25. The non-transitory computer readable storage medium of claim 20, to generate one or more pan around videos, the processing device further to:

generate a first pan around video that provides a view of the event that pans around the event in a clockwise direction; and generate a second pan around video that provides a view of the event that pans around the event in a counter-clockwise direction.

* * * * *